United States Patent
Eick et al.

(10) Patent No.: US 8,261,875 B2
(45) Date of Patent: Sep. 11, 2012

(54) SEISMIC TRANSDUCERS AND BASEPLATES HAVING EXTERNAL DAMPENERS AND METHODS OF USE

(75) Inventors: Peter M. Eick, Houston, TX (US); Joel D. Brewer, Houston, TX (US); Shan Shan, Houston, TX (US)

(73) Assignee: ConocoPhillips Company, Houston, TX (US)

(*) Notice: Subject to any disclaimer, the term of this patent is extended or adjusted under 35 U.S.C. 154(b) by 0 days.

(21) Appl. No.: 13/028,029

(22) Filed: Feb. 15, 2011

(65) Prior Publication Data

US 2011/0198148 A1      Aug. 18, 2011

Related U.S. Application Data

(60) Provisional application No. 61/305,697, filed on Feb. 18, 2010, provisional application No. 61/305,689, filed on Feb. 18, 2010, provisional application No. 61/305,692, filed on Feb. 18, 2010.

(51) Int. Cl.
*G01V 1/04* (2006.01)
(52) U.S. Cl. ........................................... 181/121
(58) Field of Classification Search ................... 181/121
See application file for complete search history.

(56) References Cited

U.S. PATENT DOCUMENTS

| | | | |
|---|---|---|---|
| 3,106,982 A | 10/1963 | Wade | |
| 3,282,372 A | 11/1966 | Brown et al. | |
| 3,522,460 A | 8/1970 | Spurlin | |
| 3,866,709 A | 2/1975 | Mifsud | |
| 4,059,820 A | 11/1977 | Turpening | |
| 4,108,270 A | 8/1978 | Mifsud | |
| 4,116,299 A | 9/1978 | Martin | |
| 4,133,409 A | 1/1979 | Mifsud et al. | |
| 4,135,599 A | 1/1979 | Fair | |
| 4,147,228 A | 4/1979 | Bouyoucos | |
| 4,184,144 A | 1/1980 | Rickenbacker | |
| 4,253,538 A | 3/1981 | Weber et al. | |

(Continued)

FOREIGN PATENT DOCUMENTS

CA      1147842      6/1983

(Continued)

OTHER PUBLICATIONS

European Patent Office, Registered Letter, EP No. 11 154 319.5, Jan. 7, 2011, 4 pages.

(Continued)

*Primary Examiner* — Forrest M Phillips
(74) *Attorney, Agent, or Firm* — ConocoPhillips Company

(57) ABSTRACT

Methods and systems are provided for inducing seismic vibrations into subterranean formations. Seismic transducers may comprise a frame, a reaction mass, a driver, and a baseplate. The driver actuates the reaction mass, imparting a vibratory energy to the baseplate. This vibratory energy is then imparted directly to the ground surface to propagate seismic waves into the formation. These seismic waves are then reflected by subsurface geological features. The reflected seismic waves may then be detected and interpreted by seismic detectors to reveal seismic information representative of the surveyed region. An external dampener may be secured to the baseplate, which provide, among other benefits, a damping effect to the baseplate. Advantages include, reduced undesirable baseplate harmonic distortion or "ringing," reduced baseplate decoupling, and reduced seismic noise due to flexure reduction and more uniform baseplate-to-ground conformance. These advantages ultimately translate to improved seismic surveys, having higher formation resolution and reaching greater depths.

22 Claims, 3 Drawing Sheets

U.S. PATENT DOCUMENTS

| | | | |
|---|---|---|---|
| 4,406,345 A | 9/1983 | Fair | |
| 4,410,062 A | 10/1983 | Mifsud | |
| 4,458,777 A | 7/1984 | Weber et al. | |
| 4,639,905 A | 1/1987 | Goodloe | |
| 4,664,222 A | 5/1987 | Jones et al. | |
| 4,676,337 A | 6/1987 | Martin | |
| 4,750,157 A | 6/1988 | Shei | |
| 4,766,974 A * | 8/1988 | Cole et al. | 181/113 |
| 4,782,446 A | 11/1988 | Ehler et al. | |
| 4,804,062 A * | 2/1989 | Airhart | 181/121 |
| 4,848,512 A * | 7/1989 | Airhart | 181/114 |
| 4,853,906 A | 8/1989 | Cole | |
| 4,853,907 A * | 8/1989 | Bays | 367/189 |
| 4,928,784 A * | 5/1990 | Meynier | 181/106 |
| 4,967,870 A * | 11/1990 | Airhart | 181/121 |
| 5,000,285 A * | 3/1991 | Airhart | 181/113 |
| 5,035,297 A * | 7/1991 | Meynier | 181/106 |
| 6,381,544 B1 | 4/2002 | Sallas et al. | |
| 6,488,117 B1 * | 12/2002 | Owen | 181/121 |
| 6,561,310 B2 | 5/2003 | Hoover | |
| 6,612,397 B2 | 9/2003 | Sparrevik et al. | |
| 7,107,159 B2 | 9/2006 | German | |
| 7,327,633 B2 | 2/2008 | Bagaini et al. | |
| 7,841,444 B2 * | 11/2010 | Cannell et al. | 181/121 |
| 7,864,630 B2 | 1/2011 | Chiu et al. | |
| 2002/0149998 A1 | 10/2002 | Hoover | |
| 2005/0011713 A1 * | 1/2005 | Yasumoto et al. | 188/373 |
| 2007/0205042 A1 | 9/2007 | Temple et al. | |

FOREIGN PATENT DOCUMENTS

| | | |
|---|---|---|
| GB | 2305243 | 4/1997 |

OTHER PUBLICATIONS

European Patent Office, European Search Report, EP No. 11 15 4319.5, Jun. 7, 2011, 4 pages.

U.S. Appl. No. 61/378,164, Eick.

U.S. Appl. No. 61/372,318, Eick.

U.S. Appl. No. 61/372,327, Eick.

U.S. Appl. No. 11/677,438, Eick.

"TRI-AX", Industrial Vehicles International, Inc., Oil & Gas, 1 page.

"Shear Wave Option", Industrial Vehicles International, Inc., Minivib, 1 page.

Michael Hall, "Analysis of Field Tests With an Improved Hydraulic Vibrator", ION Geophysical Corporation, 4 pages.

\* cited by examiner

SEISMIC TRANSDUCERS AND BASEPLATES HAVING EXTERNAL DAMPENERS AND METHODS OF USE

CROSS-REFERENCE TO RELATED APPLICATIONS

This application is a non-provisional application which claims the benefit of and priority to U.S. Provisional Application Ser. No. 61/305,697, filed Feb. 18, 2010, entitled "Seismic Transducers and Baseplates Having External Dampeners and Methods of Use", U.S. Provisional Application Ser. No. 61/305,689, filed Feb. 18, 2010, entitled "Seismic Transducers Having Improved Polygonal Baseplates and Methods of Use", and U.S. Provisional Application Ser. No. 61/305,692, filed Feb. 18, 2010, entitled "Seismic Transducers Having Reduced Surface Area Baseplates and Methods of Use", all disclosures of which are hereby incorporated by reference.

FIELD OF THE INVENTION

The present invention relates generally to methods and systems for inducing seismic vibrations into an elastic medium. More particularly, but not by way of limitation, embodiments of the present invention include methods and systems for inducing seismic vibrations into subterranean formations utilizing baseplates having external dampeners.

BACKGROUND

Various methods of geophysical exploration have been developed to aid in the determining the nature of subterranean formations for exploratory oil and gas drilling. Several surveying systems have been developed that utilize one or more vibratory energy sources to induce seismic waves that are directed into the ground and reflected back to the surface by different geological subsurface layers.

In these reflection-type seismic surveys, the reflected seismic waves are detected at the surface by a group of spaced apart receivers called geophones, accelerometers, seismometers or similar transducers. These transducers are collectively referred to as "geophones" herein following industry convention, but it is understood that they could be any sensor that converts seismic energy into some readable data. The reflected seismic waves detected by the geophones are analyzed and processed to generate seismic data representative of the nature and composition of the subterranean formation at various depths, including the nature and extent of hydrocarbon deposits. In this way, the seismic information collected by geophones can be used to produce seismic reflection signals which can be processed to form images of the subsurface.

It has become common in many cases to use, as the source of propagating elastic waves, a hydraulically-operated vibratory source more simply referred to as a vibrator. There are other forms of energy sources for vibrators like electromechanical or pure electric. All of these systems typically generate vibrations or shock waves by using a reaction mass member that is actuated by a hydraulic or electric system and electrically controlled by a servo valve. In a typical embodiment, a vibrator comprises a double ended piston rigidly affixed to a coaxial piston rod. The piston is located in reciprocating relationship in a cylinder formed within a heavy reaction mass. Means are included for alternately introducing hydraulic fluid under high pressure to opposite ends of the cylinder or for an electric coil and magnet type assembly to impart a reciprocating motion to the piston relative to the reaction mass. The piston rod extending from the reaction mass is rigidly coupled to a baseplate, which is maintained in intimate contact with ground surface. Since the inertia of the reaction mass tends to resist displacement of the reaction mass relative to the earth, the motion of the piston is coupled through the piston rod and baseplate to impart vibratory seismic energy in the earth.

Typically, vibrators are transported by carrier vehicle, and it is also known to prevent decoupling of the baseplate from the ground by applying a portion of the carrier vehicle's weight to the baseplate during operation. The weight of the carrier vehicle is frequently applied to the baseplate through one or more spring and stilt members, each having a large compliance, with the result that a static bias force is imposed on the baseplate, while the dynamic forces of the baseplate are decoupled from the carrier vehicle itself. In this way, the force from the vibrating mass is transferred through the baseplate into the earth at a desired vibration frequency. The hydraulic system forces the reaction mass to reciprocate vertically, at the desired vibration frequency, through a short vertical stroke.

This type of vibrational seismic exploration system typically uses a quasi-sinusoidal reference signal, or so-called pilot signal, of continuously varying frequency, selected band width, and selected duration to control the introduction of seismic waves into the earth. The pilot signal is converted into a mechanical vibration in a land vibrator having a baseplate which is coupled to the earth. The land vibrator is typically mounted on a carrier vehicle, which provides locomotion. During operation, the baseplate is contacted with the earth's surface and the weight of the carrier vehicle is applied to the baseplate. A servo-hydraulic piston connected to the baseplate is then excited by the pilot signal, causing vibration of the baseplate against the earth.

A significant problem with conventional systems employing a vibrating baseplate to impart seismic waves into the earth is that the actual motion of the baseplate, and thus the actual seismic energy imparted to the earth, is different from the ideal motion represented by the pilot signal. This difference can be caused by a variety of factors, including (1) harmonic distortion or "ringing" of the baseplate, (2) decoupling of the baseplate from the earth's surface commonly referred to as bouncing or "pogo-sticking," and (3) flexure of the baseplate. The differences between the pilot signal and the actual baseplate motion are problematic because, in the past, the pilot signal was used to pulse-compress the reflected seismic signal either through correlation or inversion. Thus, where the actual motion of the baseplate differs from the ideal motion corresponding to the pilot signal, the pulse-compressed reflected seismic signal that is produced by correlation or more modernly by inversion is inaccurate.

The data gathering and correlating portion of the various seismic exploration systems have been improved to the point that problems have been discovered with the performance of existing baseplates. These problems are related to the fact that baseplates have resonant frequencies and they also vibrate, both of which produce distortions in the generated energy signal. These distortions are carried completely through the process and detrimentally affect the geological information produced.

Conventional methods of compensating for distorted signals include electronic filters which attempt to correct any distortions by modulating the force, frequency of stroke, and the center of stroke of the vibrating reaction mass. Unfortunately, electronic filters have not proven adequate in eliminating or sufficiently reducing seismic signal distortions under many operating conditions.

Accordingly, these deficiencies of conventional baseplates (e.g. harmonics, decoupling, and baseplate flexure) are problematic in that each of these problems contribute to producing a distorted seismic signal. Baseplate flexure is not only problematic from the standpoint of generating a distorted seismic signal, but it is also problematic, because flexure of the baseplate contributes to structural failure of the baseplate. Another approach has been taken by some vibrator manufacturers to make the baseplate stiffer. This approach is typified by the stiffer vibrator plate taught by Hall. See Michael Hall, *Analysis of Field Tests with an Improved Hydraulic Vibrator*, Society of Exploration Geophysicists, THE INTERNATIONAL EXPOSITION AND 79TH ANNUAL MEETING, Oct. 25-30, 2009. This modification, however, is expensive and requires replacement of the baseplate and hydraulics with no backwards compatible replacement possible. The key problem with a stiffer baseplate is that long term structural rigidity and failure are still unknown while the problem of baseplate ringing still remains. That is, making the baseplate more rigid only serves to cause the baseplate to ring at a different frequency. For example, a thin ½" bar of steel that is fixed with one end exposed and then struck with a hammer will ring at a particular frequency. A thicker, stiffer bar under the same situation will still ring, just at a different tone. In this way, all that is gained by merely reinforcing a baseplate is moving the ringing problem to a different frequency band.

Accordingly, there is a need in the art for improved seismic vibrator assemblies and the baseplates thereof that address one or more disadvantages of the prior art.

SUMMARY

The present invention relates generally to methods and systems for inducing seismic vibrations into an elastic medium. More particularly, but not by way of limitation, embodiments of the present invention include methods and systems for inducing seismic vibrations into subterranean formations utilizing baseplates having external dampeners.

One example of a method for inducing seismic energy waves in a subterranean formation comprises the steps of: providing a seismic transducer apparatus comprising a frame, a baseplate attached to the frame, the baseplate having a lower surface, an external dampener secured to the lower surface of the baseplate, a reaction mass supported by the frame, and a driver configured to actuate the reaction mass in a reciprocating motion so as to impart vibratory energy to the baseplate; engaging the ground surface with the external dampener; actuating the reaction mass via the driver in a reciprocating motion; allowing vibratory energy to be imparted to the baseplate so as to propagate seismic energy waves through the external dampener in the subterranean formation; allowing the seismic energy waves to propagate through the subterranean formation so as to produce reflected and refracted seismic energy waves; and detecting one or more of the reflected and refracted seismic energy waves.

One example of a seismic transducer apparatus for inducing energy waves in an elastic medium comprises: a frame; a baseplate attached to the frame, the baseplate having a lower surface; an external dampener secured to the lower surface of the baseplate; a reaction mass supported by the frame; and a driver configured to actuate the reaction mass in a reciprocating motion so as to impart vibratory energy to the baseplate.

In other embodiments, the external dampener may be affixed to an upper surface of the baseplate. In still other embodiments, the external dampener may be affixed to both the lower and upper surface of the baseplate.

The features and advantages of the present invention will be apparent to those skilled in the art. While numerous changes may be made by those skilled in the art, such changes are within the spirit of the invention.

BRIEF DESCRIPTION OF THE DRAWINGS

A more complete understanding of the present disclosure and advantages thereof may be acquired by referring to the following description taken in conjunction with the accompanying figures, wherein.

Figure 1:
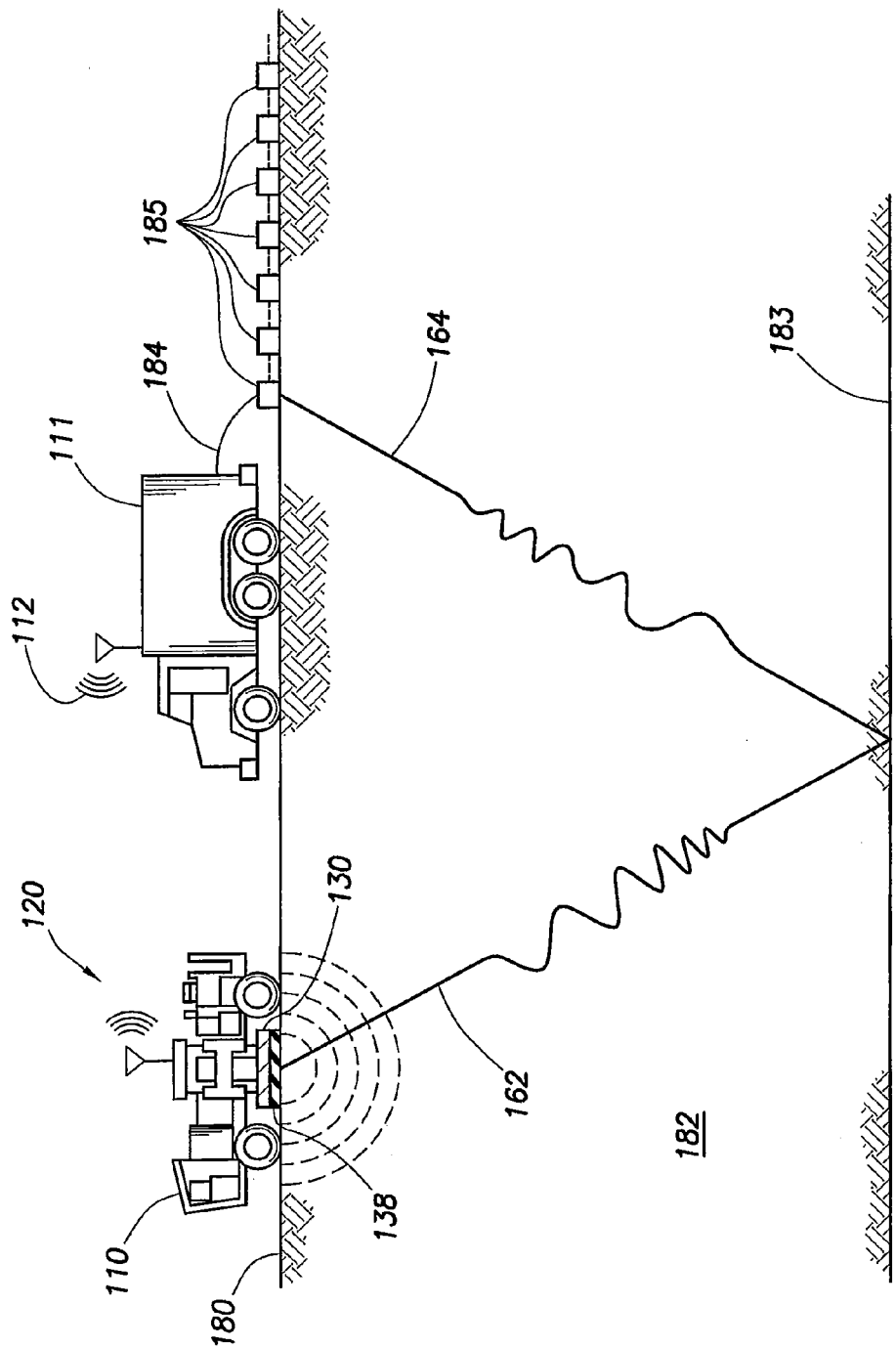
FIG. 1 illustrates a side view of one example of a seismic exploration system in accordance with one embodiment of the present invention.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The present invention relates generally to methods and systems for inducing seismic vibrations into an elastic medium. More particularly, but not by way of limitation, embodiments of the present invention include methods and systems for inducing seismic vibrations into subterranean formations utilizing baseplates having external dampeners.

Methods and systems are provided for inducing seismic energy waves in a subterranean formation. In certain embodiments, seismic transducers in accordance with the present invention comprise a frame, a reaction mass supported by the frame, a driver, and a baseplate attached to the frame. The driver actuates the reaction mass in a reciprocating motion, imparting a vibratory energy to the baseplate. As the baseplate is engaged with a ground surface during operation, the vibratory energy of the baseplate is imparted directly to the ground surface so as to propagate seismic waves into the subterranean formation. The seismic waves are then reflected and refracted by the subsurface strata and geological features. The reflected and refracted seismic waves may then be detected by a plurality of seismic detectors. The detected seismic data is then interpreted to reveal seismic information representative of the surveyed region of the earth.

A dampener may be secured to the lower surface of the baseplate. In certain embodiments, the dampener may be an elastomeric dampener. Among other benefits, dampeners in accordance with the present invention provide a damping effect to the induced seismic waves of the baseplate. Advantages of adding such dampeners include, but are not limited to, a reduction of undesirable baseplate harmonics and ringing, reduced baseplate decoupling, and reduction of seismic noise due to a reduction of flexure and more uniform source point to source point coupling. These advantages ultimately translate to improved seismic surveys, having higher resolution of the formations surveyed and resulting in surveys reaching greater depths.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

FIG. 1 illustrates a side view of one example of a seismic exploration system in accordance with one embodiment of the present invention. A pilot signal is generated in recorder/processor carrier vehicle 111 and sent by radio wave link 112 to a land vibrator 120. Land vibrator 120 converts the pilot signal into mechanical motion that vibrates baseplate 130. Dampener 138 is secured or otherwise affixed to the lower surface of baseplate 130. Dampener 138 contacts ground surface 180 of the earth and is coupled to ground surface 180 by the weight of carrier vehicle 110. Baseplate 130 imparts induced seismic waves 162 through dampener 138 into subsurface 182 of the earth. Notably, in the particular embodiment depicted here, dampener 138 extends across baseplate 130 so as to cover the substantial entirety of the lower surface of baseplate 130.

Induced seismic wave 162 travels downward through subsurface 182 and is altered (i.e., refracted and/or reflected) by subsurface strata 183. Altered seismic waves 164 travels from subsurface strata 183 upward through subsurface 182 to surface 180. Seismic receivers 185, such as geophones, located on surface 180, are generally spaced apart from each other and from land vibrator 120. Seismic receivers 185 measure altered seismic waves 164 at surface 180 and transmit an altered seismic signal indicating altered seismic wave 28 across geophone lines 184 to recorder/processor carrier vehicle 110. This communication may be accomplished via wires conventionally, or with autonomous recorders where the data is later collected and transcribed to the recording media. A baseplate signal is transmitted from land vibrator 120 via radio wave link 112 to recorder/processor carrier vehicle 110 for processing. In this way, seismic survey data is collected and interpreted so as to reveal the nature and the geology of subterranean formation 182.

Figure 2A:
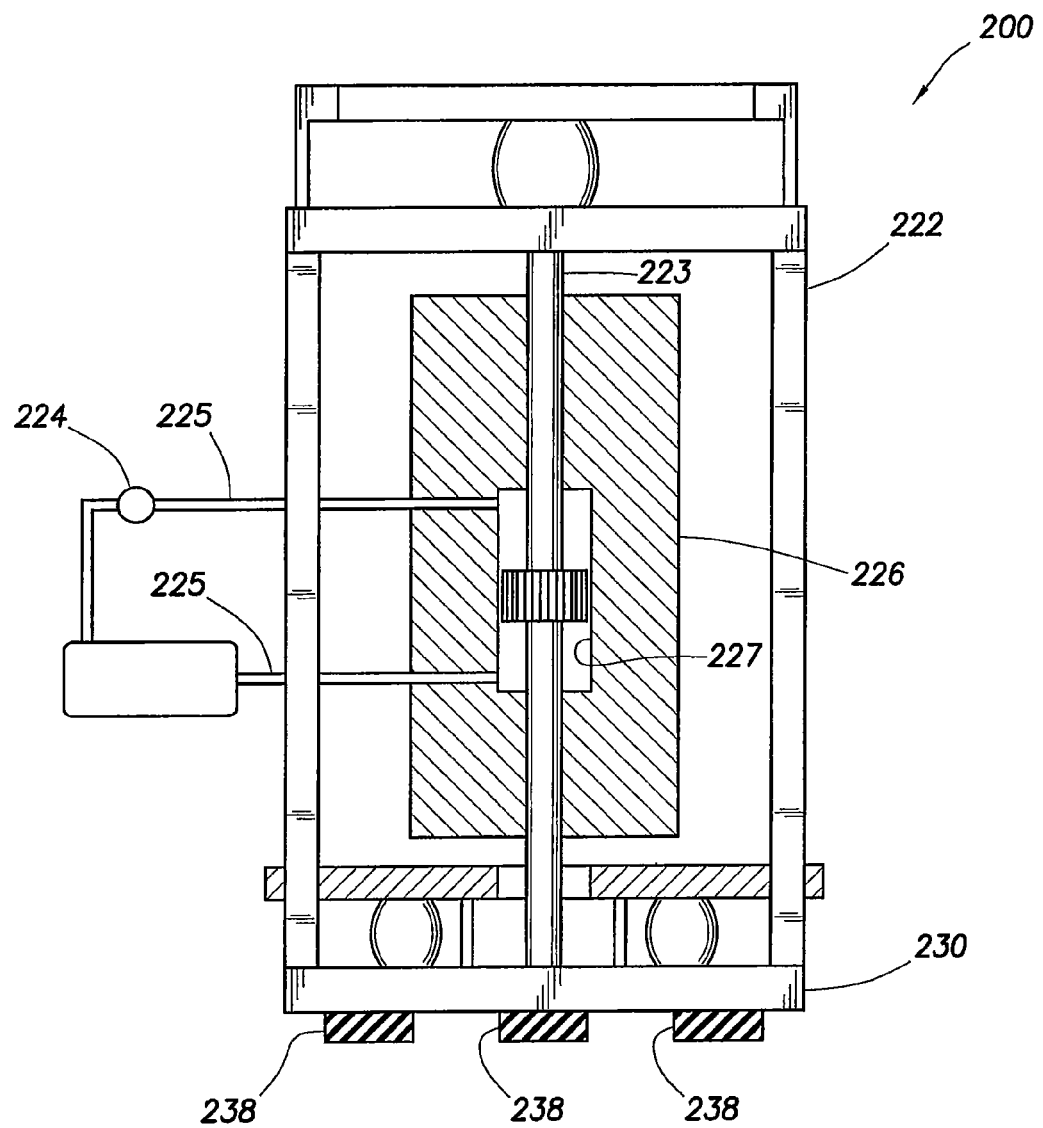
FIG. 2A illustrates a side view of one example of a seismic transducer having an external dampener affixed to the lower surface of a baseplate in accordance with one embodiment of the present invention.

FIG. 2A illustrates a side view of one example of a seismic transducer having an external dampener affixed to the lower surface of a baseplate in accordance with one embodiment of the present invention. Seismic transducer apparatus 200 utilizes a reciprocating motion of reaction mass 225 to impart vibratory energy to baseplate 230.

More specifically, frame 222 supports and is rigidly connected to piston rod 223 and baseplate 230. Driver 224 pumps or otherwise supplies hydraulic fluid to hydraulic cylinder 227 through ports 225. In this way, driver 224 actuates reaction mass 226 about piston rod 223. When vibrations are induced by controlled hydraulic fluid flow into and from cylinder 227, reciprocating motion of reaction mass 226 is generated about piston rod 223. As reaction mass 226 is supported by frame 222, this reciprocating motion is transmitted to baseplate 230 via the inertia of reaction mass 226. The term, "supported," as used herein, explicitly includes being indirectly supported by frame 222, for example, by hydraulic fluid in hydraulic cylinder 227. In this way, vibratory energy is imparted to baseplate 230 corresponding to the motion of reaction mass 226. Dampener 238 is secured or otherwise affixed to the lower surface of baseplate 230. Dampener 238 engages ground surface 180 of the earth. In this way, baseplate 230 transmits the vibratory energy through dampener 238 to a ground surface (such as ground surface 180 depicted in FIG. 1).

Dampener 238 may comprise any material known in the art suitable for producing a damping effect on baseplate 230. Examples of suitable damping materials include, but are not limited to, rubber, carbon-fiber impregnated rubber, viscoelastic damping polymers, elastomeric composites, synthetic and natural elastomeric materials, or any combination thereof.

Another advantage provided by external dampener 238 is its ability to provide for enhanced source point to source point coupling. That is, under certain conditions such as a rough or non-uniform ground surface, a rigid, flat baseplate is unable to couple directly to the ground along the entire surface area of the baseplate. The non-uniformity of the ground can thus result in areas of the baseplate that are not directly coupled to the ground, leaving substantial gaps between the portions of the baseplate and the non-uniform ground. External dampener 238, in certain embodiments, such as when made of an elastomeric material, can conform to the ground surface along areas of minimal non-uniformity. That is, external dampener 238 may be capable of "filling-in the gaps" due to the somewhat elastic nature of external dampener 238. In this way, external dampener 238 provides superior source point to source point coupling.

Here in FIG. 2A, dampener 238 is secured to only a portion of the lower surface of baseplate 230. In certain embodiments, dampener 238 may be secured or otherwise affixed to about 30% to about 75% of the surface area of the lower surface of baseplate 230. In certain embodiments, dampener 238 may be comprised of a plurality of individual dampener elements, separately affixed to baseplate 230. Among other advantages, providing a plurality of individual dampener elements allows for ease of replacement if individual elements are damaged or if a different damping material is determined to function better in a particular geological circumstance.

The thickness of dampener 238 may be tuned to provide optimal reduction of seismic noise and undesirable harmonics. In certain embodiments, dampener 238 may vary from about ½ inches to about 4 inches. Terrain and geological conditions will influence optimal baseplate dimensions and configuration. Accordingly, different thicknesses and materials may be required in different areas.

In certain embodiments, dampener 238 comprises an elastomer having a density of at least about 80 lbs/ft$^3$, a density of at least about 90 to about 150 lbs/ft$^3$, or a density of at least about 100 to about 200 lbs/ft$^3$. Dampeners 238 may comprise elastomers having compressive strengths of at least about 15 psi and in other embodiments, of at most about 15,000 psi. In other embodiments, dampeners 238 may comprise elastomers having compressive strengths of at least about 150 psi and in other embodiments, of at most about 150 psi.

The enhancements described herein allow seismic transducers that to operate at higher seismic frequencies ranges without producing substantial signal distortion or noise. In certain embodiments, seismic transducers of the present invention operate at frequency ranges extending into the higher seismic frequency range of at least about 50 cycles per second, at least about 150 cycles per second, and/or at least about 250 cycles per second.

Figure 2B:
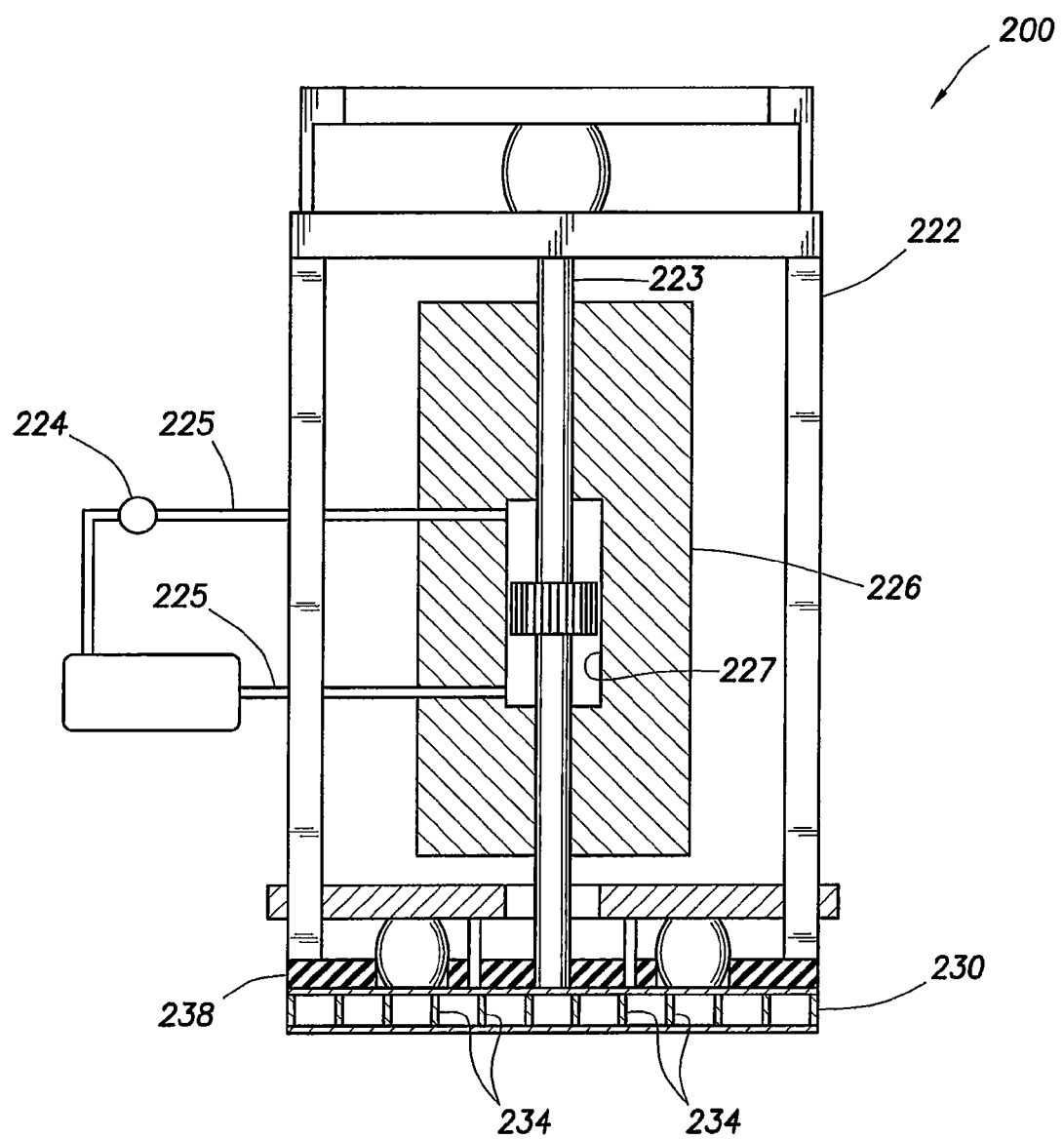
FIG. 2B illustrates a side view of one example of a seismic transducer having an external dampener affixed to the upper surface of a baseplate in accordance with one embodiment of the present invention.

FIG. 2B illustrates a side view of one example of a seismic transducer having an external dampener affixed to the upper surface of a baseplate in accordance with one embodiment of the present invention. Here, external dampener 238 is affixed to the upper surface of baseplate 230. By securing external dampener 230 to the upper surface of baseplate 230 instead of the lower surface of baseplate 230, external dampener 238 still performs its function of reducing or eliminating harmonics or ringing from baseplate 230. In this configuration, however, external dampener 238 is not exposed directly to impact with a ground surface and thus may avoid premature damage or deterioration.

It is recognized that some embodiments may comprise external dampeners 238 affixed to both the lower and upper surfaces of baseplate 230 to provide enhanced damping of baseplate 230. External dampener 238 may be secured to the surface of baseplate 230 by any manner known in the art for affixing a dampener pad to a baseplate, including but not limited to, using adhesive, welding, screws, bolts, or any combination thereof.

Additionally, in certain embodiments, baseplate 230 may comprise reinforcing ribs 234. These ribs or I-beams provide additional reinforcement while allowing for a much lighter baseplate. Thus, such a baseplate may be more resistant to flexure and fatigue failures while at the same time avoiding the severe weight penalty that a corresponding solid baseplate would impose. In this way, baseplate plate 230 may be maintained within acceptable weight limitations and yet be capable of withstanding large forces generated by a seismic transducer.

It is explicitly recognized that any of the elements and features of each of the devices described herein are capable of use with any of the other devices described herein with no limitation. Furthermore, it is explicitly recognized that the steps of the methods herein may be performed in any order except unless explicitly stated otherwise or inherently required otherwise by the particular method.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations and equivalents are considered within the scope and spirit of the present invention.

What is claimed is:

1. A method for inducing seismic waves in a subterranean formation comprising the steps of:
providing a seismic transducer apparatus comprising a frame, a baseplate attached to the frame, the baseplate having a lower surface, an external dampener secured to the lower surface of the baseplate, a reaction mass supported by the frame, and a driver configured to actuate the
reaction mass in a reciprocating motion so as to impart vibratory energy to the baseplate; engaging the ground surface with the external dampener;
selecting an operating frequency range at which to actuate the reaction mass;
actuating the reaction mass via the driver in a reciprocating motion at a frequency within the operating frequency range;
selecting the external dampener so as to dampen any harmonics or ringing of the baseplate that would otherwise occur without the presence of the external dampener within the operating frequency range;
allowing vibratory energy to be imparted to the baseplate so as to propagate seismic energy waves through the external dampener in the subterranean formation;
allowing the external dampener to dampen any harmonics or ringing of the baseplate that would otherwise occur without the presence of the external dampener within the operating frequency range;
allowing the seismic energy waves to propagate through the subterranean formation so as to produce reflected and refracted seismic energy waves; and
detecting one or more of the reflected and refracted seismic energy waves.

2. The method of claim 1 further comprising the step of actuating the reaction mass at the operating frequency range extending into a higher seismic frequency ranges above about 50 cycles per second.

3. The method of claim 2 further comprising the step of actuating the reaction mass at the operating frequency range extending into the higher seismic frequency range above about 150 cycles per second.

4. The method of claim 1 further comprising the step of actuating the reaction mass over a frequency sweep that includes one or more operating frequencies extending into a higher seismic frequency range above about 150 cycles per second.

5. The method of claim 1 wherein the external dampener comprises an elastomer.

6. The method of claim 5 wherein the external dampener is an elastomeric external dampener.

7. The method of claim 5 wherein the elastomer has a density of at least about 50 lbs/ft$^3$.

8. The method of claim 5 wherein the elastomer has a density of at least about 90 to about 150 lbs/ft$^3$.

9. The method of claim 5 wherein the elastomer has a density of at least about 100 to about 200 lbs/ft$^3$.

10. The method of claim 5 wherein the elastomer has a compressive strength of at least about 15 psi.

11. The method of claim 5 wherein the elastomer has a compressive strength of at least about 150,000 psi.

12. A seismic transducer apparatus for inducing energy waves in an elastic medium comprising:
A frame;
A baseplate attached to the frame, the baseplate having a lower surface;
An external dampener secured to the lower surface of the baseplate wherein the external dampener is configured to dampen any harmonics or ringing of the baseplate at a selected operating frequency range;
A reaction mass supported by the frame; and
A driver configured to actuate the reaction mass in a reciprocating motion at the selected operating frequency range so as to impart vibratory energy to the baseplate.

13. The seismic transducer apparatus of claim 12 wherein the external dampener comprises an elastomer.

14. The seismic transducer apparatus of claim 13 wherein the external dampener is an elastomeric external dampener.

15. The seismic transducer apparatus of claim 13 wherein the elastomer has a density of at least about 50 lbs/ft$^3$.

16. The seismic transducer apparatus of claim 13 wherein the elastomer has a density of at least about 90 to about 150 lbs/ft$^3$.

17. The seismic transducer apparatus of claim 13 the elastomer has a density of at least about 100 to about 200 lbs/ft$^3$.

18. The seismic transducer apparatus of claim 13 wherein the elastomer has a compressive strength of at least about 12,000 psi.

19. The seismic transducer apparatus of claim 13 wherein the elastomer has a compressive strength of at least about 15,000 psi.

20. The seismic transducer apparatus of claim 13 wherein the external dampener is configured to be adjacent to a ground surface.

21. A method for inducing seismic energy waves in a subterranean formation comprising the steps of:

providing a seismic transducer apparatus comprising a frame, a baseplate attached to the frame, the baseplate having an upper surface, an external dampener secured to the upper surface of the baseplate, a reaction mass supported by the frame, and a driver configured to actuate the reaction mass in a reciprocating motion so as to impart vibratory energy to the baseplate; engaging the ground surface with the baseplate; selecting an operating frequency range at which to actuate the reaction mass;

actuating the reaction mass via the driver in a reciprocating motion at a frequency within the operating frequency range;

selecting the external dampener so as to dampen any harmonics or ringing of the baseplate that would otherwise occur without the presence of the external dampener within the operating frequency range;

allowing vibratory energy to be imparted to the baseplate so as to propagate seismic energy waves to the subterranean formation;

allowing the external dampener to dampen any harmonics or ringing of the baseplate that would otherwise occur without the presence of the external dampener within the operating frequency range;

allowing the seismic energy waves to propagate through the subterranean formation so as to produce reflected and refracted seismic energy waves; and detecting one or more of the reflected and refracted seismic energy waves.

22. A seismic transducer apparatus for inducing energy waves in an elastic medium comprising:

a frame;

a baseplate attached to the frame, the baseplate having an upper surface; an external dampener secured to the upper surface of the baseplate wherein the external dampener is configured to dampen any harmonics or ringing of the baseplate at a selected operating frequency range;

a reaction mass supported by the frame; and a driver configured to actuate the reaction mass in a reciprocating motion at the selected operating frequency range so as to impart vibratory energy to the baseplate.

* * * * *